Figure 3:
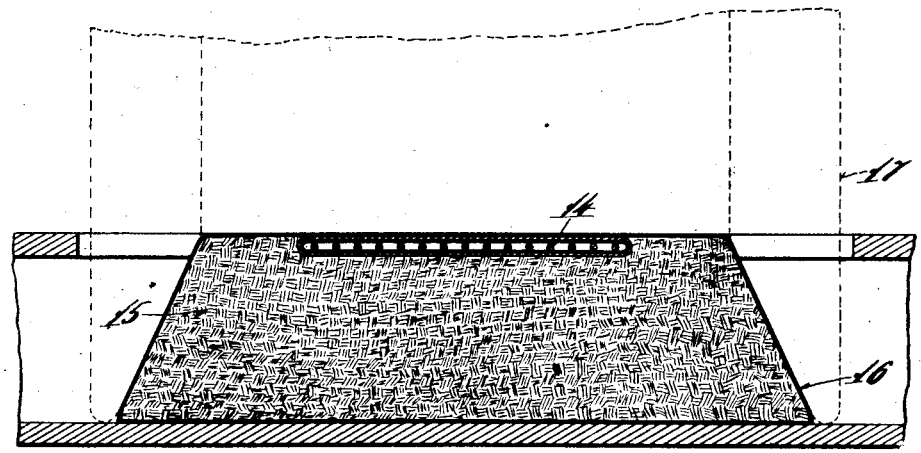

A. L. SYKES.
COOKING APPLIANCE.
APPLICATION FILED MAY 24, 1912.
1,086,870.
Patented Feb. 10, 1914.
2 SHEETS—SHEET 1.
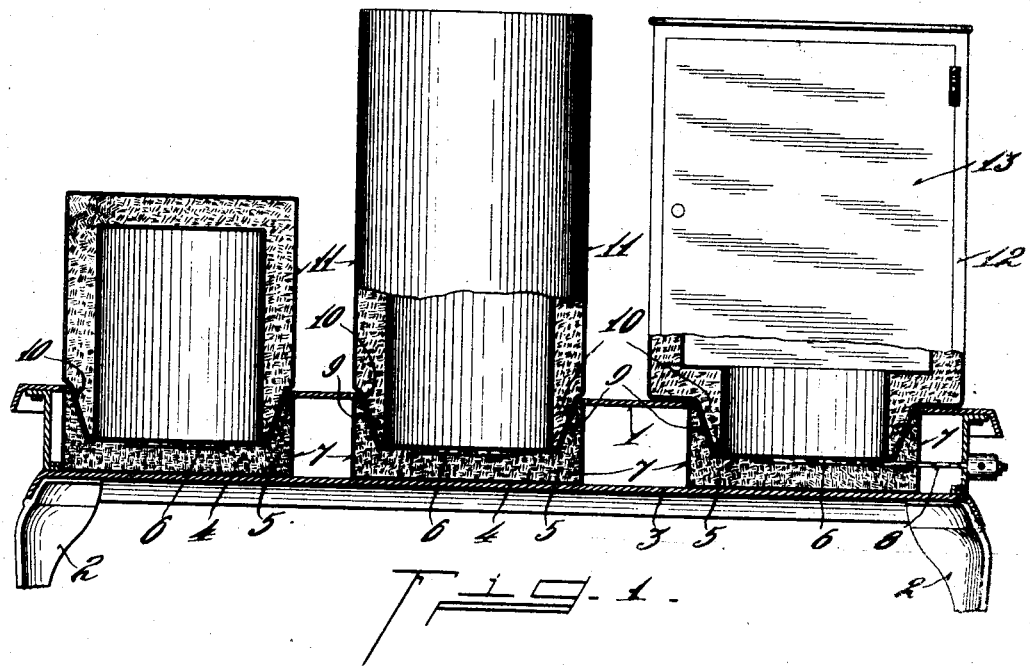
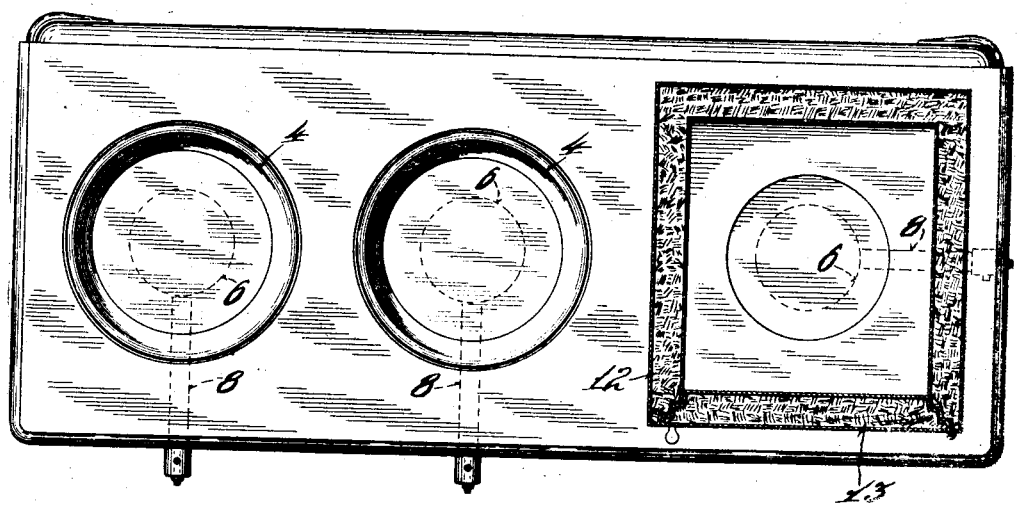
Witnesses
Inventor
Alexander L. Sykes
By Nord Nord & Nathan
Attorneys

A. L. SYKES.
COOKING APPLIANCE.
APPLICATION FILED MAY 24, 1912.

1,086,870.

Patented Feb. 10, 1914.
2 SHEETS—SHEET 2.

Witnesses

Inventor
Alexander L. Sykes
By Nord Nord & Nathan
Attorneys

UNITED STATES PATENT OFFICE.

ALEXANDER L. SYKES, OF COVINGTON, KENTUCKY.

COOKING APPLIANCE.

1,086,870.  Specification of Letters Patent.  Patented Feb. 10, 1914.

Application filed May 24, 1912. Serial No. 699,499.

*To all whom it may concern:*

Be it known that I, ALEXANDER L. SYKES, a citizen of the United States, residing at Covington, in the county of Kenton and State of Kentucky, have invented certain new and useful Improvements in Cooking Appliances, of which the following is a specification.

My invention provides a cooking appliance combining the utility of a heater with that of a fireless cooker, in which the heater may serve the purposes of a commercial cooking stove, and in which electricity is used as the heating medium. The stove is converted into a fireless cooker by capping the heating member with an insulated casing capable of having a socketed connection with the heating member, which member in the preferred embodiment forms a unitary structure with the electric heater element.

One of the objects of my invention is to provide a cooking appliance of commercial stove design of table form with an electric heater element supported by the table top and embedded and unitarily formed within a casing therefor, providing an insulated heater base or member receiving and telescopically locking an insulated cap or cover to form a receptacle when united, adapting the same to the usages of a fireless cooking appliance.

Another object is to render available a sectional heat insulating casing in which a sealed heating element is inclosed within a casing, with the casing formed unitarily with the heating element by electro-deposition formed around insulating material as a body. This completely protects the electric heating element against moisture and providing a double walled base of integral form with no open joints leading to the insulating material, providing a unitary structure of heater and base very efficient in the utilization of the appliances of fireless cookers as well as heaters, and cheapens the construction.

Another object of my invention is to provide a cooking appliance in the nature of an electric cooking stove in which the heater element serves as a base of a fireless cooker compartment.

Another object of my invention is to provide an electric heating element applied within a casing, and embedded within insulating material with the casing formed as a unitary part of the heater and surrounding the insulating material by electrodeposition.

Another object of my invention is to provide a combined heating and fireless cooking appliance with an electric heater element embodied within a casing formed of heat resisting material having an exposed heater surface and adapted to be united with a cover to form a heat retaining compartment, whereby the initial cooking can be done by artificial heat, whereby the stored and latent heat of the electric heater element is utilized to complete the cooking after the heating energy has been cut off.

Another object of my invention is to provide a heating element as an insulated base for a heat retaining receptacle.

Another object is to render available a sectional heat insulating casing in which an electric heating element is integrally combined with one of the sections thereof and sealed against access of air or moisture so as to effectively resist corrosion and to provide an apparatus essentially in the form of a structural unit in which the heating element is disposed in a position such that its heat is applicable directly to the interior of the apparatus and in which loss of heat to the exterior is diminished by the interposition of heat insulating material, with the receptacle arranged as a cover and adapted to serve as an oven or baker with a door provided within said receptacle for gaining access to the interior of the receptacle without removal from the base.

The features of my invention will be more fully set forth in the description of the accompanying drawings, forming a part of this specification, in which:—

Figure 1 is a central vertical section of my improved combined stove and fireless cooker arranged in multiple units of different capacities and usage in which each unit comprises an electric insulated heater base and cover. Fig. 2 is a top plan view with the oven element of one unit illustrated in horizontal section and with the cover elements of the other two units forming the complete stove omitted. In the figures two forms of heating elements are illustrated, but in principle and mode of operation are the duplicate of each other, and in a preferred organization are duplicates rendering the cover members interchangeable. Fig. 3 is an enlarged sectional view of a modified form of heater base of one of the carbon units.

While the drawings illustrate the cooking appliance as a cooking stove of table design as of preferred form to meet sanitary requirements of the present day, it is obvious that the design can be variously modified, and in this nature serves as only a support for an insulated electric heater member comprising a base for a receptacle or cover. The heater member as a receptacle base may likewise be variously modified from the form illustrated, and united with a cover and the union may be of any special or common form to provide a hermetically sealed joint and resist heat radiation from the interior of the base and cover as an insulated compartment.

One of the essential characteristics of my invention is in providing an electric heating element sealed within a disk and seated within insulating material having a heat radiating surface thereof exposed and by electrodeposition depositing a shell over the heating surface of the electric heating element and insulating material, to form an integral casing over the same, integrally united with the electric heating element, and of a design to provide a peripheral interlocking joint with a cover. This forms an absolute seal and incases the electric heating element and insulating material free from any joints leading to the interior, which would admit moisture or the like to the electric heating element. This enables the insulating material to be compressed into the proper form, making the same compact and increasing its efficiency as a heat insulator, provides a more sanitary structure and prevents short circuiting of the conductors forming the electric heater element as all of the parts form a unitary structure of integral quality.

The electric deposition of metal over the electric heater element and insulating material may be accomplished by any of the well known processes and the various kinds of metal deposited common in the art or otherwise, and the thickness of deposit is such as to meet and withstand the usage to which the structure as a whole is contemplated, and therefore, I have no special preference as to the manner or procedure requisite for producing such coating or casing, but am only concerned herewith in providing an integral casing surrounding entirely an electric heating element, and heat resisting insulator to form a cooking stove base, having the combined functions heretofore alluded to.

1 represents the stove top or table plate supported by the legs 2. This table or top, as illustrated is of box-form, the base 3 of which serves as a support for the heating members 4. The construction illustrated, comprises three cooker units in the series, but the number can be increased or decreased to meet particular demands. The heater member 4, as shown in Fig. 1, forms a base of shallow vessel form of double wall formation, with insulating material and electric heater element intermediate thereof, adapted to telescopically receive a cover, said cover being utilized when the stove is used as a fireless cooker. The heater members 4 are preferably constructed by shaping in a suitable manner to a particular design and outline insulating material 5 which may be of any kind or class of material known in the art as heat resisting material, as for instance asbestos, wood pulp or composition.

6 represents an electric heater element preferably of a disk form and in which the electric conductors are arranged in a horizontal plane between the mica sheets and the whole incased within a sheet metal casing, which casing has its joints welded together. The electric heater element may, however, be of any form of construction and other than disk form. The electric heater element 6 is embedded within the insulating material having an upper heating surface exposed and in plane with a parallel surface of the insulating material. The insulating material and its contained electric heater element are incased by a metallic covering 7, preferably applied under the processes in the metallurgical art of electro-deposition of metals, forming a shell around the entire surface of the outside or exposed surfaces or faces of the heater element and insulating material and thereby providing a casing free from joints. It is obvious, however, that such integral casing may be otherwise formed, as for instance, a sheet metal casing may be compressed over the exposed faces of the electric heater element and insulating material and the joints welded together, but by forming the casing under a process of electro-deposition of metal, the casing can be more substantially united and provide a substantially unitary integral member and a metal of non-corrosive nature used upon the shell or casing. The electric heater element 6 has a terminal tube 8 projected outwardly for making the usual electric connections with the heater element. The conductor terminals may be projected from the heater element through the base as a whole under various modifications from that illustrated herewith to accommodate convenience, utility and cheapness of construction.

In the form of heater base shown in Figs. 1 and 2, which is of shallow vessel form, it is provided with the tapering wall 9, adapted to telescopically receive a relatively tapered wall 10, of a double walled insulated cover 11. The covers 11 may be of various areas, as illustrated in Fig. 1, and may be of a form as the cover 12, serving the functions of a baking oven. This cover or oven 12 is provided with a door 13, preferably of double wall form with insulating material intermediate thereof and with the joints between the oven and door members of such a nature as to hermetically seal the opening when the door is closed. The covers are interchangeable with the various heater members of the series. The heaters with the covers removed are utilized in the well-known manner of electric stoves to initially cook after which the electric circuit is cut off and the cooking vessels incased with the covers, and the stove utilized under the principles of a fireless cooker. The two-fold advantages and principles being clearly set forth and the interlocking connection between the heater base member and cover being along the lines as set forth in a prior patent issued to me on October 10, 1911, No. 1,005,357, and all the advantages therein set forth are inherent in my present improvement.

In the modified form of heater base illustrated in Fig. 3, the general principles heretofore mentioned in the description of the construction shown in Figs. 1 and 2 are maintained, but the base is not of shallow vessel form and its upper surface is preferably in plane with the top of the stove, and shows a reversal of form of tapering telescopic joint between the base and cover. This form of base brings the joints between it and the cover below the heating zone of the base and reduces the radiation effective through the joint to a minimum. In this construction 14 represents the electric heater element embedded within the insulating material 15, having its upper surface in plane with the upper surface of surrounding insulating material. A metallic casing 16 incloses the heater element and insulating material, and preferably secured to the upper or exposed surface of the heater element, making a joint so that the parts are substantially of integral construction. The circumferential wall of the unitary structure is tapering outwardly from the upper portion to the lower to form a seal in applying a cover member 7 thereon, as shown in dotted line Fig. 3. Such unitary form provides a self-contained heater base for a fireless cooker appliance to interchangeably receive various sizes and styles of cover members, and also present a flush or plane top when used as a heater or stove. The advantages of such form of heater base are manifold and in particular offer convenience and free access in cleaning and also provide the cover joint below the heating plane, reducing radiation losses.

For the purpose of defining the structure in the claims the insulating material is termed as a composite body member, this as heretofore stated may be of any of the various kinds of material with its method of formation within the casing obviously inherent to the kind of material employed, as for instance if a composition material is employed it may be molded or compressed into shape. The term composite body designates an insulating filler. The essential characteristics of the invention comprising an electric heater element within a metallic casing forming a unitary base structure, capable of receiving interchangeably, cover members of different sizes and styles with the connecting joint below the exposed heater plane.

Having described my invention, I claim:—

1. A heating appliance comprising an electric heater element of disk form seated within insulating material surrounding said heating element below the heating zone, a casing unitarily formed around said heater element and insulating material of disk form, tapering outwardly from its upper edge adapted to telescopically unite in an insulated cover receptacle.

2. In a heating appliance, comprising an electric heater element of sealed disk form embedded within insulating material, with one face thereof in plane with the surface of said insulating material, a shell formed around said insulating material and integrally with the exposed surface of said heater element, the peripheral surface of said heater, providing a joint adapted to interlock with a cover member, with the joint below the heat zone.

3. A heating appliance of the nature disclosed unitarily combining a composite body, an electric heater element seated within said body having its exposed heating surface in plane with the surrounding body, and a casing inclosing said body and heater element in direct contact with the heating surface of said heater and formed circumferentially to telescopically unite with a cover receptacle with the union thereof below the plane of the heating surface.

4. A heating appliance of the nature disclosed combining a composite body, an electric heater element seated within said body and surrounded thereby below its heating zone, a casing surrounding said heater element and body having its circumferential surface tapering outwardly from its upper edge adapted to telescopically unite the cover receptacle.

5. A heating appliance of the nature disclosed combining an electric heater element, a casing surrounding said element forming a base for a removable superstructure with its circumferential surface providing a joint for the removable superstructure below the heating plane of said heater element.

6. A heating appliance of the nature disclosed unitarily combining a composite body, an electric heater element seated within said body having its exposed heating surface in plane with the surrounding body and a casing inclosing said body and heater element, integral with the heating surface of said heater and circumferentially formed to telescopically unite with a cover receptacle, with the union thereof below the plane of the heating surface.

7. A heating appliance of the nature disclosed combining an electric heater element, a casing having a plane heating surface adjacent said heater element, forming a base for a removable superstructure with its circumferential surface providing a joint for the removable superstructure below the heating plane of said heater element.

8. A heating appliance of the nature disclosed combining a composite body, an electric heater element seated within said body having its exposed heating surface in plane with the surrounding body, and a casing inclosing said body and heater element having an upper plane surface adjacent said heater element, said components unitarily forming a base for a removable cover member, and a cover receptacle connected to said base with the joint below the heating plane of the base.

9. A heating appliance comprising an electric heater element of disk form seated within insulating material surrounding said heating element below the heating zone, a casing formed around said heater element and insulating material circumferentially tapering outwardly from its edge adapted to telescopically unite with an insulated cover receptacle.

10. In a heating appliance comprising an electric heater element of sealed disk form embedded within insulating material, with one face thereof in plane with the surface of said insulating material, a shell formed around said insulating material, the peripheral surface of said shell providing a joint for a removable cover member below the heat zone.

In testimony whereof, I have hereunto set my hand.

ALEXANDER L. SYKES.

Witnesses:
OLIVER B. KAISER,
CLARENCE B. FOSTER.

---

Copies of this patent may be obtained for five cents each, by addressing the "Commissioner of Patents, Washington, D. C."